United States Patent Office 3,549,634
Patented Dec. 22, 1970

3,549,634
8,5 - AMINO - SUBSTITUTED - TETRAHYDRO-HALO-SULFAMYL-QUINAZOLINONES
Bola Vithal Shetty, Rochester, N.Y., assignor to Pennwalt Corporation, East Orange, N.J., a corporation of Pennsylvania
No Drawing. Filed Mar. 28, 1968, Ser. No. 717,003
The portion of the term of the patent subsequent to Dec. 26, 1984, has been disclaimed and dedicated to the Public
Int. Cl. C07d 51/48
U.S. Cl. 260—256.5                          7 Claims

ABSTRACT OF THE DISCLOSURE

A 1,2,3,4-tetrahydro - 7 - halo-6-sulfamyl-4-quinazolinone compound having diuretic properties, characterized by having in the 3-position an aryl or aralkyl radical which may be substituted in the ring with, for example, halogen or loweralkyl; and by having, in the 5- or 8-position, or both, a substituted or unsubstituted amino group.

---

This invention relates to 1,2,3,4-tetrahydro-6-sulfamyl-3-aryl or 3-aralkyl-4-quinazolinone compounds having diuretic characteristics. More particularly it relates to 1,2,3,4-tetrahydro-7-halo or 7-haloalkyl-6-sulfamyl-3-aryl or 3-aralkyl compounds substituted in the 5- and/or 8-position.

In my Pat. No. 3,360,518 issued Dec. 26, 1967, there are disclosed and claimed compounds of the above type having hydrogen in both the 5- and 8-positions. These compounds are effective diuretics.

In the prior art normal or unsaturated quinazolinone compounds having aryl or aralkyl in the 3-position and hydrogen in the 5- and 8-positions were known by the publication of Japanese patent publication 14,021 of July 5, 1965 (Pat. No. 459,533) but such compounds were found to induce only slight diuresis and to have only slight diuretic value as compared to applicants saturated quinazolinones of Pat. No. 3,360,518.

Applicant found that the compounds of his Pat. 3,360,518 have useful diuretic characteristics when the radicals such as the amino or mono-alkylamino or di-alkyl-amino replace at least one of the 5- and 8-hydrogens.

In accordance with this invention 1,2,3,4-tetrahydro-7-halo or haloalkyl-6-sulfamyl-3-aryl or aralkyl-4-quinazolinone compounds have in the 5- and/or 8-position the groups amino, mono-loweralkylamino or di-loweralkyl-amino in one of said positions and hydrogen or one of the said above radicals in the other position. These compounds are diuretics, which compare favorably with the analogous diuretic compounds of my Pat. 3,360,518.

The compounds of this invention are preferably of the following formula:

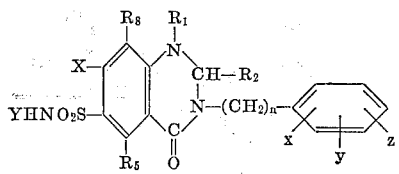

and the pharmaceutically acceptable salts thereof, in which X is halogen or trifluoromethyl; Y is hydrogen, loweralkyl, phenylloweralkyl or acyl; $R_1$ is hydrogen, loweralkyl, or phenylloweralkyl; $R_2$ is hydrogen, loweralkyl, loweralkylthioloweralkyl, phenylthioloweralkyl, phenylloweralkylthioloweralkyl, halogen substituted loweralkyl, lowercycloalkyl, lowercycloalkylloweralkyl, aralkyl or substituted aralkyl in which the aryl is phenyl or naphthyl, the alkyl is a loweralkyl and the aryl substituent is hydroxy, loweralkoxy, loweralkyl, halogen, trifluoromethyl, sulfamyl or amino; $R_5$ and $R_8$ are hydrogen, amino, monoloweralkylamino, or di-loweralkylamino, except where either $R_5$ or $R_8$ is hydrogen the other is not hydrogen; $x$ is hydrogen, loweralkyl, hydroxy, loweralkoxy, loweralkoxyloweralkyl, $NH_2$, sulfamyl, halogen, or trifluoromethyl; $y$ and $z$ are any of the members of $x$, and $n$ is an integer from 0–4.

In the above formula X is preferably chlorine or trifluoromethyl, but bromine and the other halogens are not precluded. $R_1$ is preferably hydrogen, but loweralkyls such as methyl, ethyl, propyl, and isopropyl may be used. $R_2$ is preferably methyl or ethyl. The thioalkyl, when used, is preferably a thioloweralkyl such as methylthiomethyl, or benzylthiomethyl; the halogen of the halogen substituted alkyl is chlorine or other halogen. The aralkyl is preferably a monocyclic carbocyclic aryl loweralkyl, e.g. benzyl. $R_5$ is preferably hydrogen with $R_8$ being amino, or $R_8$ is hydrogen and $R_5$ is amino. $x$, $y$, and $z$ may be any of the stated radicals in one or more of the ortho, meta or para positions. Preferably $x$ is methyl in the ortho position, also where sulfamyl is used it is preferably present in the meta or para position with methyl in the ortho position. $R_2$ may be aryl and is preferably phenyl. The substituted aryl of $R_2$ and the substituted aralkyl of $R_2$ are suitably substituted with hydroxy, alkoxy (preferably loweralkoxy), loweralkyl, halogen, $SO_2NH_2$, trifluoromethyl, and $NH_2$.

Specific suitable compounds of the above formula include 2-methyl-3-o-tolyl-6-sulfamyl-7-chloro-8-amino-1,2,3,4-tetrahydro-4-quinazolinone;
2-methyl-3-o-tolyl-6-sulfamyl-7-trifluoromethyl-8-amino-1,2,3,4-tetrahydro-4-quinazolinone;
3-o-tolyl-5-amino-6-sulfamyl-7-chloro-8-methyl-1,2,3,4-tetrahydro-4-quinazolinone;
2-ethyl-3-o-tolyl-6-sulfamyl-7-trifluoromethyl-8-amino-1,2,3,4-tetrahydro-4-quinazolinone;
2-ethyl-3-o-tolyl-6-sulfamyl-7-chloro-8-amino-1,2,3,4-tetrahydro-4-quinazolinone;
2-methyl-3-o-tolyl-6-methylaminosulfonyl-7-chloro-8-amino-1,2,3,4-tetrahydro-4-quinazolinone;
2-methyl-3-(p-chlorophenyl)-6-sulfamyl-7-chloro-8-amino-1,2,3,4-tetrahydro-4-quinazolinone;
2-methyl-3-o-tolyl-6-methylaminosulfonyl-7-chloro-8-amino-1,2,3,4-tetrahydro-4-quinazolinone;
2-methyl-3-phenyl-6-sulfamyl-7-chloro-8-amino-1,2,3,4-tetrahydro-4-quinazolinone;
2-methyl-3-(2'-methyl-3'-chlorophenyl)-6-sulfamyl-7-chloro-8-amino-1,2,3,4-tetrahydro-4-quinazolinone;
2-methyl-3-(p-chlorophenyl)-6-methylaminosulfonyl-7-chloro-8-amino-1,2,3,4-tetrahydro-4-quinazolinone;
2-methyl-3-(2'-methylbenzyl)-6-sulfamyl-7-chloro-8-amino-1,2,3,4-tetrahydro-4-quinazolinone;
2-phenyl-3-o-tolyl-6-sulfamyl-7-chloro-8-amino-1,2,3,4-tetrahydro-4-quinazolinone;
2-propyl-3-o-tolyl-6-sulfamyl-7-chloro-8-amino-1,2,3,4-tetrahydro-4-quinazolinone;
2-butyl-3-o-tolyl-6-sulfamyl-7-chloro-8-amino-1,2,3,4-tetrahydro-4-quinazolinone;
2-propyl-3-o-tolyl-6-sulfamyl-7-trifluoromethyl-8-amino-1,2,3,4-tetrahydro-4-quinazolinone;
2-butyl-3-o-tolyl-6-sulfamyl-7-trifluoromethyl-8-amino-1,2,3,4-tetrahydro-4-quinazolinone;
2-benzylthiomethyl-3-o-tolyl-6-sulfamyl-7-chloro-8-amino-1,2,3,4-tetrahydro-4-quinazolinone;
2-(2,2,2-trifluoroethylthiomethyl)-3-o-tolyl-6-sulfamyl-7-chloro-8-amino-1,2,3,4-tetrahydro-4-quinazolinone;

2-ethylthiomethyl-3-o-tolyl-6-sulfamyl-7-chloro-8-amino-1,2,3,4-tetrahydro-4-quinazolinone;
2-chloromethyl-3-o-tolyl-6-sulfamyl-7-chloro-8-amino-1,2,3,4-tetrahydro-4-quinazolinone;
2-dichloromethyl-3-o-tolyl-6-sulfamyl-7-chloro-8-amino-1,2,3,4-tetrahydro-4-quinazolinone;
2-trichloromethyl-3-o-tolyl-6-sulfamyl-7-chloro-8-amino-1,2,3,4-tetrahydro-4-quinazolinone;
2-benzyl-3-o-tolyl-6-sulfamyl-7-chloro-8-amino-1,2,3,4-tetrahydro-4-quinazolinone;
2-(3'-sulfamyl-4'-chlorophenyl)-3-o-tolyl-6-sulfamyl-7-chloro-8-amino-1,2,3,4-tetrahydro-4-quinazolinone;
2-(3'-sulfamyl-4'-chlorobenzyl)-3-o-tolyl-6-sulfamyl-7-chloro-8-amino-1,2,3,4-tetrahydro-4-quinazolinone;
2-methyl-3-(o-hydroxyphenyl)-6-sulfamyl-7-chloro-8-amino-1,2,3,4-tetrahydro-4-quinazolinone;
2-methyl-3-(o-methoxyphenyl)-6-sulfamyl-7-chloro-8-amino-1,2,3,4-tetrahydro-4-quinazolinone;
2-methyl-3-(p-aminophenyl)-6-sulfamyl-7-chloro-8-amino-1,2,3,4-tetrahydro-4-quinazolinone;
2-methyl-3-(2'-methyl-4'-aminophenyl)-6-sulfamyl-7-chloro-8-amino-1,2,3,4-tetrahydro-4-quinazolinone;
2-methyl-3-(2'-methyl-3'-sulfamylphenyl)-6-sulfamyl-7-chloro-8-amino-1,2,3,4-tetrahydro-4-quinazolinone;
2-methyl-3-(2'-methyl-3'-sulfamylphenyl)-6-sulfamyl-7-trifluoromethyl-8-amino-1,2,3,4-tetrahydro-4-quinazolinone;
2-ethyl-3-(2'-methyl-3'-chlorophenyl)-6-sulfamyl-7-trifluoromethyl-8-amino-1,2,3,4-tetrahydro-4-quinazolinone;
2-methyl-3-(2'-methyl-3'-chlorophenyl)-6-methylaminosulfonyl-7-chloro-8-amino-1,2,3,4-tetrahydro-4-quinazolinone;
2-ethyl-3-(2'-sulfamylphenyl)-6-sulfamyl-7-chloro-8-amino-1,2,3,4-tetrahydro-4-quinazolinone;
2-cyclopentylmethyl-3-o-tolyl-6-sulfamyl-7-chloro-8-amino-1,2,3,4-tetrahydro-4-quinazolinone;
2-cyclobutyl-3-o-tolyl-6-sulfamyl-7-chloro-8-amino-1,2,3,4-tetrahydro-4-quinazolinone;
2-cyclobutyl-3-o-tolyl-6-sulfamyl-7-trifluoromethyl-8-amino-1,2,3,4-tetrahydro-4-quinazolinone;
2-cyclopropylmethyl-3-o-tolyl-6-sulfamyl-7-chloro-8-amino-1,2,3,4-tetrahydro-4-quinazolinone;
2-cyclopropyl-3-o-tolyl-6-sulfamyl-7-trifluoromethyl-8-amino-1,2,3,4-tetrahydro-4-quinazolinone;
2-methyl-3-benzyl-6-sulfamyl-7-chloro-8-amino-1,2,3,4-tetrahydro-4-quinazolinone;
2-cyclopentyl-3-o-tolyl-6-sulfamyl-7-chloro-8-amino-1,2,3,4-tetrahydro-4-quinazolinone;
1,2-dimethyl-3-o-tolyl-6-sulfamyl-7-chloro-8-amino-1,2,3,4-tetrahydro-4-quinazolinone;
1-benzyl-2-methyl-3-o-tolyl-6-sulfamyl-7-chloro-8-amino-1,2,3,4-tetrahydro-4-quinazolinone;
2-methyl-3-(2'-methyl-4'-chlorophenyl)-6-sulfamyl-7-chloro-8-amino-1,2,3,4-tetrahydro-4-quinazolinone;
2-cyclobutylmethyl-3-o-tolyl-6-sulfamyl-7-chloro-8-amino-1,2,3,4-tetrahydro-4-quinazolinone;
2-methyl-3-(2'-trifluoromethyl-4'-aminophenyl)-6-sulfamyl-7-chloro-8-amino-1,2,3,4-tetrahydro-4-quinazolinone;
the sodium salt of 2-methyl-3-o-tolyl-6-sulfamyl-7-chloro-8-amino-1,2,3,4-tetrahydro-4-quinazolinone,
and the potassium salt of 2-methyl-3-o-tolyl-6-sulfamyl-7-chloro-8-amino-1,2,3,4-tetrahydro-4-quinazolinone.

Other specific suitable compounds are the above compounds where the 8-amino is replaced by 8-mono-methylamino and di-methylamino, or other loweralkylamino groups. Also by similar methods of preparation within the skill of the art the 5- or 5- and 8-amino and mono-alkylamino and dialkylamino compounds can be prepared. These also are suitable as diuretics.

Other suitable diuretic compounds are tabulated below in Table I.

TABLE I

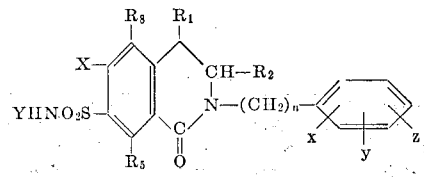

| $R_1$ | $R_2$ | x | y | z | $R_8$ | $R_5$ | X | Y | n |
|---|---|---|---|---|---|---|---|---|---|
| H | H | H | H | H | $NH_2$ | H | Cl | H | 0 |
| H | Me | H | H | H | $NH_2$ | H | Cl | H | 0 |
| H | Et | H | H | H | $NH_2$ | H | Cl | H | 0 |
| H | Ph | H | H | H | $NH_2$ | H | Cl | H | 0 |
| Me | H | H | H | H | $NH_2$ | H | Cl | H | 0 |
| Et | H | H | H | H | $NH_2$ | H | Cl | H | 0 |
| H | H | 2-Me | H | H | $NH_2$ | H | Cl | H | 0 |
| H | H | 2-Me | 3-Me | H | $NH_2$ | H | Cl | H | 0 |
| H | H | 2-Me | 3-Me | 4-Me | $NH_2$ | H | Cl | H | 0 |
| H | Me | 2-Me | 3-Me | 4-Me | $NH_2$ | H | Cl | H | 0 |
| H | Me | 2-Cl | H | H | $NH_2$ | H | Cl | H | 0 |
| H | Me | 2-Me | H | H | H | $NH_2$ | Cl | H | 0 |
| H | Me | 2-Me | H | H | EtNH | H | Cl | H | 0 |
| H | Me | 2-Me | H | H | PrNH | H | Cl | H | 0 |
| H | Me | 2-Me | H | H | MeNH | H | Cl | H | 0 |
| H | Me | 2-Me | H | H | $Me_2N$ | H | Cl | H | 0 |
| H | Me | 2-Me | H | H | H | MeNH | Cl | H | 0 |
| H | Me | 2-Me | H | H | H | EtNH | Cl | H | 0 |
| H | Me | 2-Me | H | H | H | PrNH | Cl | H | 0 |
| H | Me | 2-Me | H | H | Me | $Me_2N$ | Cl | H | 0 |
| H | Me | 2-Me | H | H | H | $Et_2N$ | Cl | H | 0 |
| H | Me | 2-Me | H | H | $NH_2$ | $NH_2$ | Br | H | 0 |
| H | Me | 2-Me | H | H | $NH_2$ | $NH_2$ | F | H | 0 |
| H | Me | 2-Me | H | H | $NH_2$ | $NH_2$ | $CF_3$ | H | 0 |
| H | Me | 2-Me | H | H | $NH_2$ | $NH_2$ | Cl | H | 1 |
| H | Me | 2-Me | H | H | $NH_2$ | $NH_2$ | Cl | H | 2 |
| H | Me | 2-Me | H | H | $NH_2$ | $NH_2$ | Cl | H | 3 |
| H | Me | 2-Me | H | H | MeNH | MeNH | Cl | H | 3 |
| H | Me | 2-Me | H | H | $Me_2N$ | PrNH | Cl | H | 4 |
| H | Me | 2-Me | H | H | MeNH | $Me_2N$ | Cl | Me | 0 |
| Me | Me | 2-Me | 3-Me | 4-Me | $NH_2$ | EtNH | Cl | H | 0 |
| Me | Me | 2-Me | 3-Cl | 4-Me | $NH_2$ | $Et_2N$ | Cl | H | 0 |
| H | Me | 2-Me | H | H | H | $NH_2$ | $CF_3$ | H | 0 |
| H | Me | 2-Me | H | H | $Me_2N$ | $NH_2$ | $CF_3$ | H | 0 |

NOTE—Me=methyl; Et=ethyl; Pr=propyl.

The following examples are given to illustrate the preparation of compounds of this invention:

Preparation of 8-amino-7-chloro-2-methyl-6-sulfamyl-3-(o-tolyl)-1,2,3,4-tetrahydro-4-quinazolinone Synthetic Route:

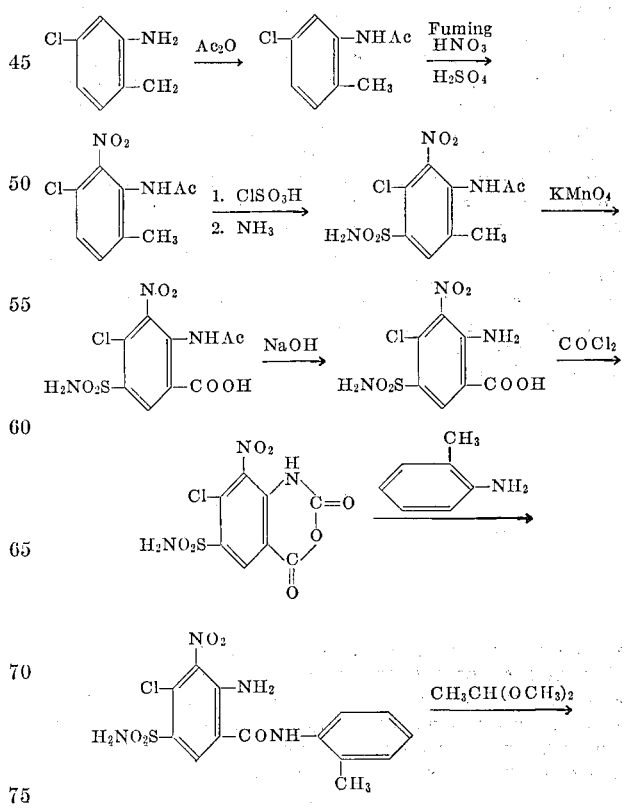

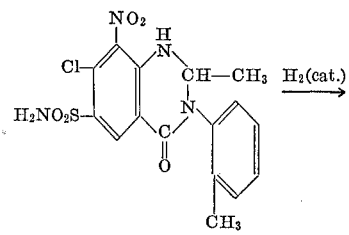

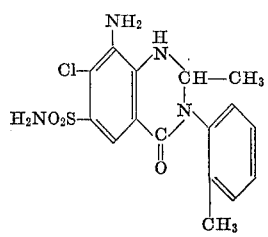

The other compounds of this invention can be made by modification of ingredients and quantities of the above example as is well understood by those skilled in the art. Also the compounds may be made by a modification of the method disclosed in my Pat. 3,360,518, as will be apparent to those skilled in the art.

From pharmacology tests run on 2-methyl-3-o-tolyl-6-sulfamyl-7-chloro-8-amino-1,2,3,4 - tetrahydro - 4(3H)-quinazolinone (Compound A) and other indications and analogy the compounds of this invention are effective diuretics, saluretics, and antihypertensives with low toxicity. For example, the following is a summary of the pharmacology on the above 8-amino compound:

SUMMARY (a) Symptomatology and acute LD50 in mice

Orally—LD50>1000 mg./kg. (48 hours) no symptoms at 562 mg./kg.

Interperitoneal—LD50>316 mg./kg. (48 hours) some hypothermia and decreased spontaneous motor activity at 316 mg./kg.

(b) Cardiovascular in dog

Doses intravenously up to 10 mg./kg. were administered. There were no changes in the cardiovascular system.

(c) Diuretic assay in rats

When administered by the oral route in initial assays measuring output of urine (ml./kg.), Na+ and Cl− (meq./kg.) at 4 hours and 21 hours after drug administration, compound A was found to promote water and salt loss, has a rapid onset and prolonged action, and appears to have a potency greater than that of quinethazone.

The above compound A and the other compounds of this invention are suitable for inducing diuresis in warm blooded animals when administered in .1 mg.–10 mg. per kg. of body weight. The compounds may be administered in the same manner as for quinethazone, orally or intravenously.

In the preceding specification the temperatures, wherever given, are in degrees centigrade.

Therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

Other suitable specific compounds not mentioned above include 2 - cyclopropyl - 3-o-tolyl-6-sulfamyl-7-chloro-8-amino - 1,2,3,4 - tetrahydro - 4 - quinazolinone; 1-methyl-2 - methoxy - 3 - o - tolyl - 6 - sulfamyl - 7 - chloro-8-amino - 1,2,3,4 - tetrahydro - 4 - quinazolinone; 1-methyl-3 - o - tolyl - 6 - sulfamyl - 7 - chloro-8-methylamino-1,2,3,4 - tetrahydro - 4 - quinazolinone, and 3 - o - tolyl-5 - dimethylamino - 6 - sulfamyl - 7 - chloro - 8-methoxymethyl-1,2,3,4-tetrahydro-4-quinazolinone.

What is claimed is:

1. A member of the group of compounds of the formula:

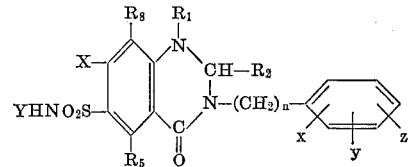

and pharmaceutically acceptable salts thereof, in which X is halogen or trifluoromethyl, Y is hydrogen or loweralkyl, $R_1$ is hydrogen, benzyl or loweralkyl, $R_2$ is hydrogen, loweralkyl, loweralkylthioloweralkyl, phenylthioloweralkyl, phenylloweralkylthioloweralkyl, halogen substituted loweralkyl, lowercycloalkyl, lowercycloalkylloweralkyl, aralkyl in which the aryl is phenyl or naphthyl and the alkyl is a loweralkyl, or substituted aralkyl in which the aryl is phenyl or naphthyl, the alkyl is a loweralkyl and the aryl substituent is hydroxy, loweralkoxy, loweralkyl, halogen, trifluoromethyl, sulfamyl or amino, $R_5$ is hydrogen, amino, mono-loweralkylamino, or di-loweralkylamino except wherein $R_8$ is hydrogen $R_5$ is not hydrogen, $R_8$ is the same as $R_5$ except wherein $R_5$ is hydrogen $R_8$ is one of the radicals of $R_5$ other than hydrogen, $x$ is hydrogen, loweralkyl, hydroxy, loweralkoxy, $NH_2$, sulfamyl, halogen, or trifluoromethyl, $y$ and $z$ are any of the members of $x$, and $n$ is an integer from 0–4.

2. The compound of claim 1 wherein X is chlorine, Y is hydrogen, $R_1$ is hydrogen, $R_2$ is methyl, $R_5$ is hydrogen, $R_8$ is amino, $x$ is ortho-methyl, both $y$ and $z$ are hydrogen, and $n$ is 0.

3. The compound of claim 1 wherein X is chlorine, Y is hydrogen, $R_1$ is hydrogen, $R_2$ is hydrogen, $R_5$ is hydrogen, $R_8$ is amnio, $x$ is ortho-methyl, both $y$ and $z$ are hydrogen, and $n$ is 0.

4. The compound of claim 1 wherein X is chlorine, Y is hydrogen, $R_1$ is hydrogen, $R_2$ is hydrogen, $R_5$ is hydrogen or amino, $R_8$ is amino, $x$ is ortho-methyl, both $y$ and $z$ are hydrogen, and $n$ is 0.

5. The compound of claim 1 wherein X is chlorine, Y is hydrogen, $R_1$ is hydrogen, $R_2$ is methyl, $R_5$ is hydrogen, $R_8$ is mono-methylamino, $x$ is ortho-methyl, both $y$ and $z$ are hydrogen, and $n$ is 0.

6. The compound of claim 1 wherein X is trifluoromethyl, Y is hydrogen, $R_1$ is hydrogen, $R_2$ is methyl, $R_5$ is hydrogen, $R_8$ is amino, $x$ is ortho-methyl, both $y$ and $z$ are hydrogen, and $n$ is 0.

7. The compound of claim 1 wherein X is chlorine, Y is hydrogen, $R_1$ is hydrogen, $R_2$ is methyl, $R_5$ is hydrogen, $R_8$ is amino, $x$ is ortho-methyl, both $y$ and $z$ are hydrogen, and $n$ is 0.

References Cited

UNITED STATES PATENTS

| | | | |
|---|---|---|---|
| 2,952,680 | 9/1960 | Novello | 260—256.5 |
| 3,360,518 | 12/1967 | Shetty | 260—256.5 |

ALEX MAZEL, Primary Examiner

R. J. GALLAGHER, Assistant Examiner

U.S. Cl. X.R.

260—244, 470, 556, 562; 424—251